United States Patent
Iguchi et al.

(10) Patent No.: US 10,057,441 B2
(45) Date of Patent: Aug. 21, 2018

(54) DRIVING DEVICE, IMAGE READING DEVICE, AND IMAGE FORMING APPARATUS

(71) Applicant: Sharp Kabushiki Kaisha, Osaka (JP)

(72) Inventors: Kazuhiro Iguchi, Osaka (JP); Kenji Nakanishi, Osaka (JP); Shohichi Fukutome, Osaka (JP); Yasuhiro Suto, Osaka (JP); Hiroki Kuruma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/289,498

(22) Filed: Oct. 10, 2016

(65) Prior Publication Data

US 2017/0111528 A1 Apr. 20, 2017

(30) Foreign Application Priority Data

Oct. 14, 2015 (JP) ................. 2015-203180

(51) Int. Cl.
*H04N 1/04* (2006.01)
*H04N 1/00* (2006.01)
*H04N 1/10* (2006.01)

(52) U.S. Cl.
CPC ..... *H04N 1/00559* (2013.01); *H04N 1/00557* (2013.01); *H04N 1/1026* (2013.01); *H04N 1/1043* (2013.01); *H04N 2201/0081* (2013.01); *H04N 2201/0082* (2013.01)

(58) Field of Classification Search
CPC .......... H04N 1/00559; H04N 1/00557; H04N 1/1026; H04N 1/1043; H04N 2201/0081; H04N 2201/0082

USPC ................. 358/497, 474, 505; 399/212, 211
See application file for complete search history.

(56) References Cited

U.S. PATENT DOCUMENTS

| | | | | |
|---|---|---|---|---|
| 4,728,988 A * | 3/1988 | Tsutsui | ................... | G03G 15/04 242/125.1 |
| 4,965,638 A * | 10/1990 | Hediger | ............... | H04N 1/1017 358/497 |
| 5,798,841 A * | 8/1998 | Takahashi | ............ | H04N 1/1017 358/296 |
| 7,191,944 B2 * | 3/2007 | Tamamura | ........... | H04N 1/1013 235/444 |
| 7,292,809 B2 * | 11/2007 | Nishikino | ............ | H04N 1/1026 399/177 |
| 7,483,653 B2 * | 1/2009 | Maruno | ........... | G03G 15/04036 399/211 |
| 7,688,483 B2 * | 3/2010 | Okada | .................. | H04N 1/1013 358/406 |
| 8,879,082 B2 * | 11/2014 | Hiyanagi | ............... | G06K 15/02 358/1.13 |

(Continued)

FOREIGN PATENT DOCUMENTS

JP 62-154443 A 9/1987

*Primary Examiner* — Cheukfan Lee
(74) *Attorney, Agent, or Firm* — Renner Otto Boisselle & Sklar, LLP

(57) ABSTRACT

A driving device of the present invention includes a drive wire and a drive pulley. The drive pulley has a fixing hole and a guide groove on a wire-winding surface thereof on which the drive wire is wound. The drive wire is disposed in the guide groove and fixed in a fixing hole by a fixing member. A bottom face of the guide groove has a curved face portion formed in a boundary region of the wire-winding surface and the guide groove.

8 Claims, 8 Drawing Sheets

(56) References Cited

U.S. PATENT DOCUMENTS

| | | | |
|---|---|---|---|
| 2002/0109864 A1* | 8/2002 | Nishikino | H04N 1/1026 358/418 |
| 2008/0024839 A1* | 1/2008 | Okada | H04N 1/1013 358/497 |
| 2008/0196937 A1* | 8/2008 | Okada | H04N 1/1026 174/535 |
| 2009/0180158 A1* | 7/2009 | Suto | G03G 15/605 358/474 |

* cited by examiner

DRIVING DEVICE, IMAGE READING DEVICE, AND IMAGE FORMING APPARATUS

CROSS-REFERENCE TO RELATED APPLICATIONS

The present application hereby claims priority under 35 U.S.C. § 119(a) on Patent Application No. 2015-203180 filed in Japan on Oct. 14, 2015, the entire contents of which are hereby incorporated herein by reference.

FIELD OF THE INVENTION

The present invention relates in general to driving devices, image reading devices, and image forming apparatuses and in particular to these devices and apparatuses moving a light source unit by means of a drive pulley and a drive wire.

BACKGROUND OF THE INVENTION

A conventionally proposed driving device for moving a light source unit in, for example, an image reading device or an image forming apparatus includes drive wires connected to the light source unit and drive pulleys around which the drive wires are wound. The driving device operates by driving the drive pulleys so that the drive pulleys rotate and move the light source unit.

FIGS. 11 and 12 are a schematic cross-sectional view and an external perspective view, respectively, of a drive pulley and a drive wire in a conventional driving device similar to the one disclosed in JP 62-154443 U. As illustrated in FIG. 11, a drive wire W, after being fixed in a fixing hole H on a drive pulley P by means of a fixing member B, starts to be wound in a groove G on a surface Ps of the substantially columnar drive pulley P so that the drive wire W is wound on the surface Ps. Because the drive wire W is fixed in the fixing hole H by means of the fixing member B, the winding of the drive wire W starts at a position below the surface Ps of the drive pulley P, somewhat close to the rotation center thereof, and progresses following the groove G so that the drive wire W runs on the surface Ps.

The drive wire W has flexural rigidity in accordance with the material and diameter thereof. In addition, the position of the drive wire W where the drive wire W is fixed using the fixing member B is separated from the surface Ps only by a short distance as illustrated in FIG. 12. For these reasons, the drive wire W fails in some cases to faithfully follow the shape of the surface Ps, forming bulges Wf on the surface Ps near a winding-starting position and at a boundary with the groove G.

If the drive wire W is lifted forming the bulges Wf, when the drive wire W is wound around the drive pulley P by activating the driving device, the lifted portions could disrupt winding of uniform lengths of the drive wire W or the lifted portions could be rewound upon driving and cause the drive wire W to slip. If the drive pulley P winds the drive wire W non-uniformly in this manner, the light source unit, which is a driven body connected to the drive wire W, is likewise moved non-uniformly. This non-uniform motion would undesirably cause positional deviations in image reading and hence blurring in scanned images.

The present invention, conceived in view of these conventional problems, has an object of providing a driving device, an image reading device, and an image forming apparatus each capable of preventing a drive wire from being lifted from a wire-winding surface of a drive pulley in order to reduce irregular winding caused in driving by the drive wire being lifted and to move a driven body at a uniform speed.

SUMMARY OF THE INVENTION

To achieve the object, the present invention is directed to a driving device including a drive wire and a drive pulley, the drive wire being wound around the drive pulley, the drive pulley being configured to rotate to move a driven body connected to the drive wire, the drive pulley having a fixing hole and a guide groove on a wire-winding surface thereof on which the drive wire is wound, the drive wire being disposed in the guide groove and fixed in the fixing hole by a fixing member, and a bottom face of the guide groove having a curved face portion formed in a boundary region of the wire-winding surface and the guide groove.

In this driving device in accordance with the present invention, the drive wire is wound around the drive pulley on a curved face portion formed in a boundary region of the wire-winding surface and the guide groove. This structure is capable of preventing the drive wire from being lifted from the wire-winding surface and forming bulges, thereby reducing irregular winding caused in driving by the bulges of the drive wire and moving the driven body at a uniform speed.

In one concrete example of the present invention, a flat face portion is further formed between the fixing hole and the curved face portion on the bottom face of the guide groove.

In another concrete example of the present invention, a boundary of the curved face portion and the wire-winding surface and a direction in which the fixing hole is extended make an angle of less than or equal to 90° around a rotational axis of the drive pulley.

In a further concrete example of the present invention, the fixing member is a ball terminal provided on a portion of the drive wire.

In the driving device in accordance with the present invention, a width of the guide groove may be substantially equal to a thickness of the drive wire.

In the driving device in accordance with the present invention, the curved face portion may be provided on both sides of the fixing hole in a direction in which the drive wire is wound.

The present invention, to achieve the object, is also directed to an image reading device including the aforementioned driving device, the driven body being a light source unit configured to read an object as an image.

In this image reading device in accordance with the present invention, the drive wire is likewise wound around the drive pulley on a curved face portion formed in a boundary region of the wire-winding surface and the guide groove. This structure is capable of preventing the drive wire from being lifted from the wire-winding surface and forming bulges, thereby reducing irregular winding caused in driving by the bulges of the drive wire and moving the light source unit at a uniform speed. Accordingly, the image reading device is capable of reducing blurring in scanned images, thereby producing good scanned images.

The present invention, to achieve the object, is also directed to an image forming apparatus including: the aforementioned image reading device; and a printing unit configured to print the image of the object read by the image reading device on recording paper.

In this image forming apparatus in accordance with the present invention, the drive wire is likewise wound around the drive pulley on a curved face portion formed in a boundary region of the wire-winding surface and the guide groove. This structure is capable of preventing the drive wire from being lifted from the wire-winding surface and forming bulges, thereby reducing irregular winding caused in driving by the bulges of the drive wire and moving the light source unit at a uniform speed. Accordingly, the image forming apparatus is capable of reducing blurring in scanned images and producing good scanned images, thereby forming good images.

The present invention can provide a driving device, an image reading device, and an image forming apparatus each capable of preventing a drive wire from being lifted from a wire-winding surface of a drive pulley in order to reduce irregular winding caused in driving by the drive wire being lifted and to move a driven body at a uniform speed.

DESCRIPTION OF EMBODIMENTS

First Embodiment

Figure 1:
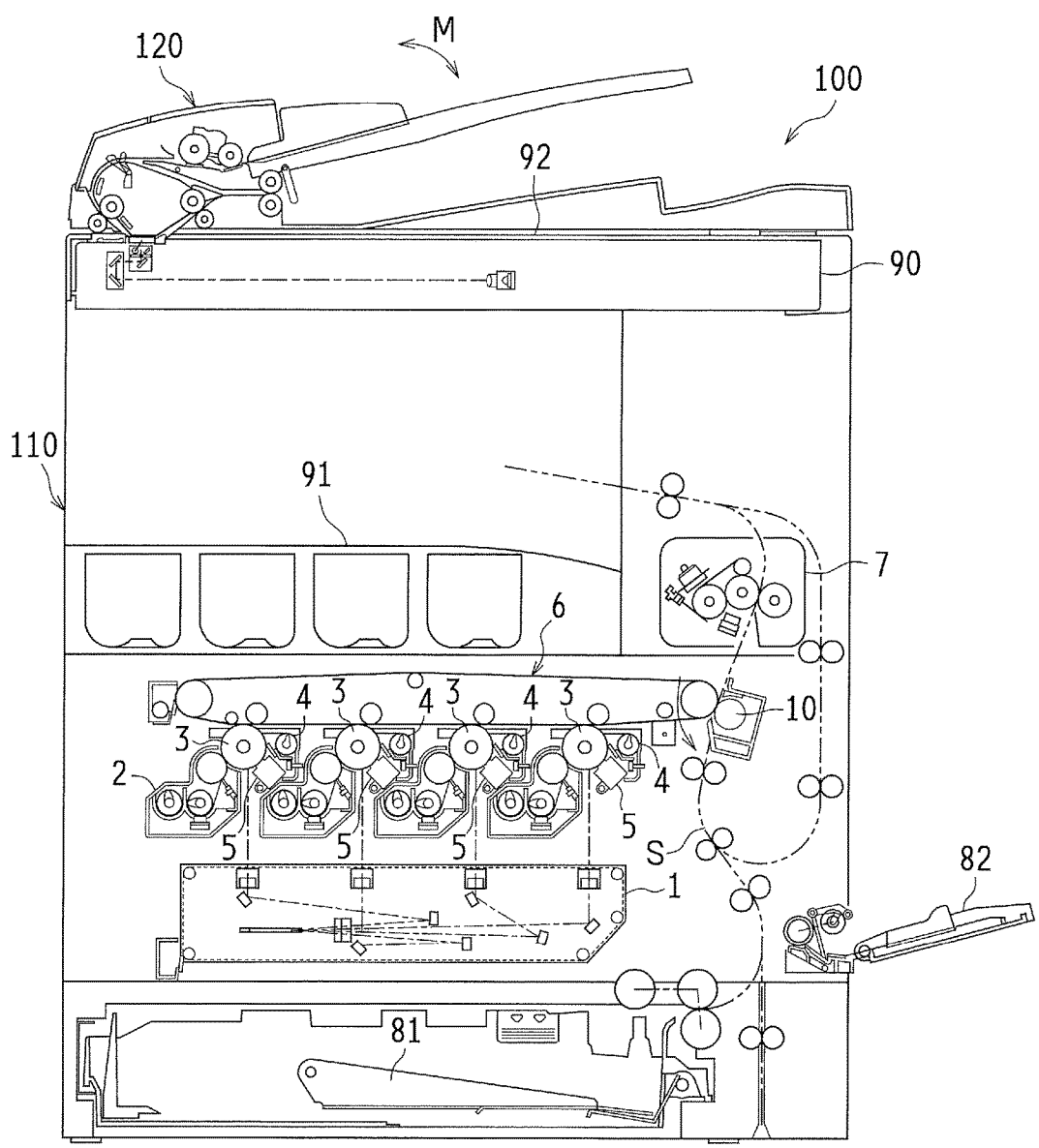
FIG. 1 is a schematic cross-sectional view of an exemplary configuration of an image forming apparatus to which the present invention is applied.

The following will describe in detail a first embodiment of the present invention in reference to drawings. FIG. 1 is a schematic cross-sectional view of an image forming apparatus 100 to which the present invention is applied. The image forming apparatus 100 includes a device main body 110 and an automatic document feeder 120. The device main body 110 in turn includes an original reading unit 90 reading an image of an original and an original stage 92 on which an original is placed.

The original reading unit 90 is disposed in an upper section of the device main body 110. The original stage 92, made of transparent glass, is disposed above the original reading unit 90. The automatic document feeder 120 is attached over the original stage 92 to automatically transport an original onto the original stage 92. The automatic document feeder 120 is structured to freely pivot around a shaft linking the automatic document feeder 120 to the device main body 110 and when opened, provides an open space above the original stage 92 so that an original can be manually placed on the original stage 92.

The automatic document feeder 120, the original reading unit 90, and the original stage 92 constitute an image reading device in accordance with the present invention. The image forming apparatus 100 forms multicolor and monochromatic images on predetermined printing paper in accordance with an original image read by the image reading device or externally provided image data.

The device main body 110 includes an exposing unit 1, development units 2, photosensitive drums 3, cleaner units 4, charging units 5, an intermediate transfer belt unit 6, a fixing unit 7, and a secondary transfer unit 10. The image data compatible with the image forming apparatus 100 represents color images by using black (K), cyan (C), magenta (M), and yellow (Y) colors. Accordingly, four sets of the development unit 2, the photosensitive drum 3, the charging unit 5, and the cleaner unit 4 are provided to form four latent images of different colors. Each set is associated with a different one of the black, cyan, magenta, and yellow colors to constitute a corresponding image station (the four sets hence constitute a total of four image stations).

The image forming apparatus 100 further includes a paper feed cassette 81, a manual paper feed cassette 82, and a discharge tray 91.

Description of Image Reading Device

Figure 2:
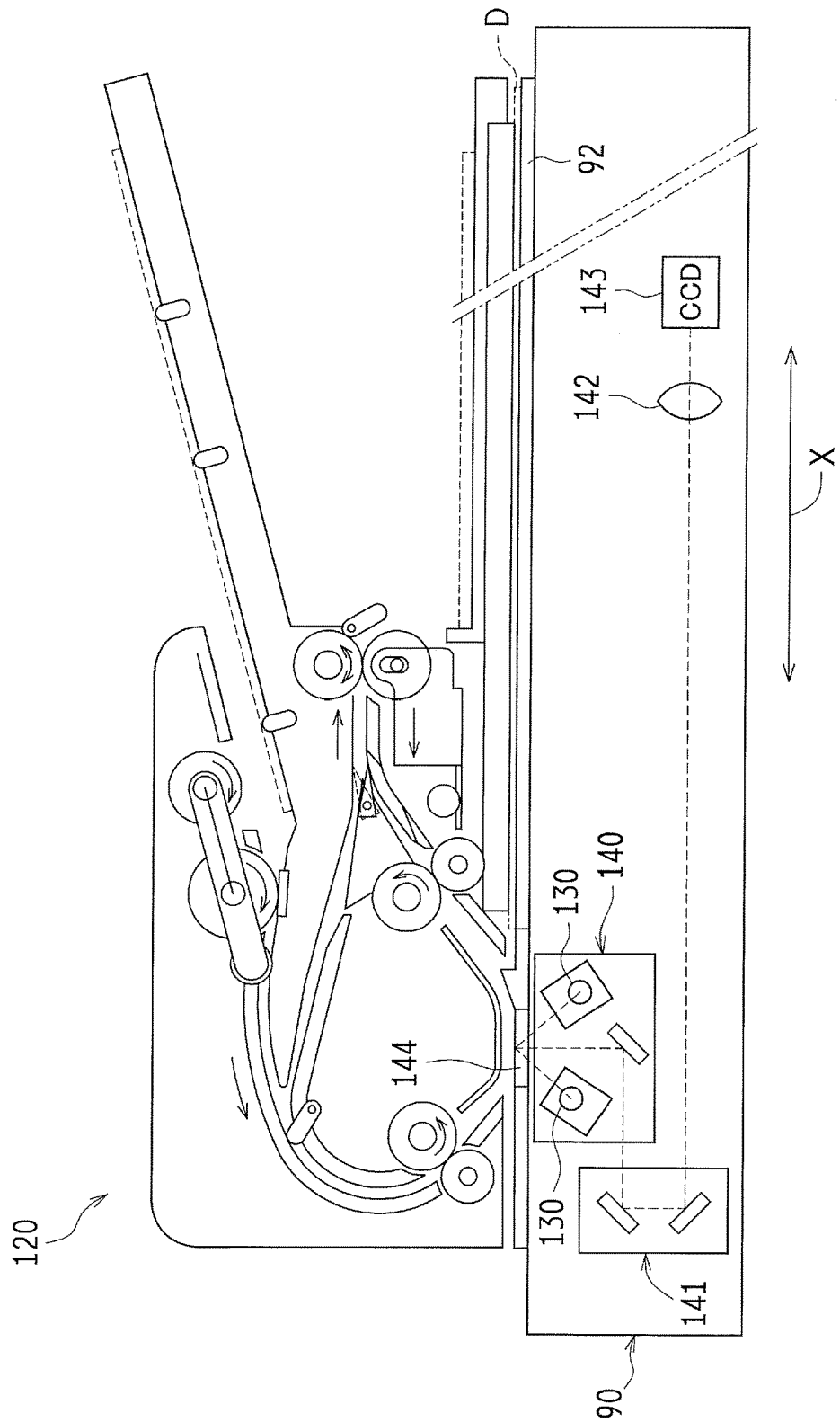
FIG. 2 is a schematic cross-sectional view of an exemplary configuration of an image reading device to which the present invention is applied.

FIG. 2 is a schematic vertical cross-sectional view of the image reading device shown in FIG. 1, that is, a combination of the automatic document feeder 120, the original reading unit 90, and the original stage 92.

The original reading unit 90 includes a light source unit 140, a mirror unit 141, a converging lens 142, and image capturing elements (here, CCDs) 143. The light source unit 140 includes a light source section 130.

The original stage 92 is made from a transparent glass plate and has both ends thereof in a main scan direction mounted to a frame body of the original reading unit 90. The automatic document feeder 120 is, for example, supported pivotally by a hinge around an axis extending in an auxiliary scan direction (i.e., extending parallel to arrow X in FIG. 2) so that the automatic document feeder 120 is openable around the axis above the original reading unit 90. The automatic document feeder 120 has a bottom surface thereof doubling as an original cover that presses down on an original D on the original stage 92 of the original reading unit 90.

The image reading device is arranged to read an original image both in original-fixing mode in which the original D is fixed and in original-moving mode in which the original D is moved.

To read an original image of the original D in original-fixing mode, the light source unit 140 moves in one of auxiliary scan directions X at a constant speed while radiating light onto the original D on the original stage 92 through the original stage 92 so as to scan an image of the original D. To do so, the light source section 130 directs light from under the original stage 92 to a plane on which the original D is placed. Simultaneously, the mirror unit 141 moves in the same one of the auxiliary scan directions X at a speed half that of the light source unit 140.

The light reflecting from the original D illuminated by the light source unit 140 (i.e., reading light) reflects from a first mirror of the light source unit 140, subsequently changes the optical path thereof at a second and a third mirror of the mirror unit 141, travels via the converging lens 142, and forms an image on the image capturing elements 143 where original image light is read and converted to electric image data.

In contrast, to read an original image of the original D in original-moving mode, the light source unit 140 and the mirror unit 141 do not move, but stay in positions thereof shown in FIG. 2, and the automatic document feeder 120 transports the original D in one of the auxiliary scan directions X in such a manner that the original D passes over a position thereof shown in FIG. 2.

Then, the light source unit 140 radiates light through an original reading glass 144 onto one of the front and back sides of the original D passing over the original reading glass 144. The light reflects from that side of the original D. As in original-fixing mode described above, the light reflecting from the original D changes the optical path thereof at the first, second, and third mirrors, travels via the converging lens 142, and forms an image on the image capturing elements 143 where the original image is read and converted to electric image data.

Description of Mechanical Structure of Image Reading Device

Figure 3:
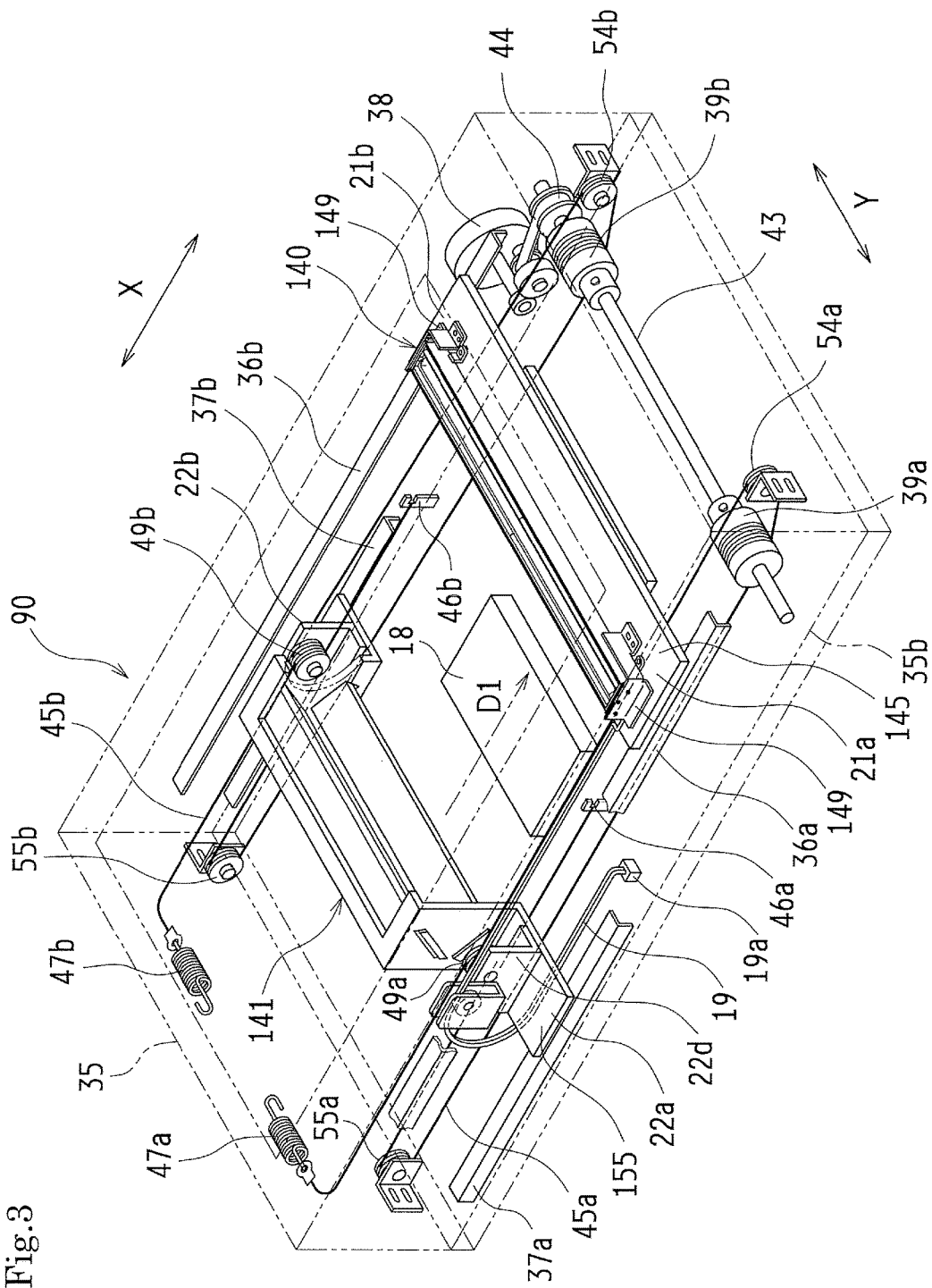
FIG. 3 is a schematic perspective view of structural specifics of a mechanical section of an original reading unit.

FIG. 3 is a schematic perspective view of structural specifics of a mechanical section of the original reading unit 90 in the image reading device arranged as above. The original reading unit 90 scans and reads the original D.

As illustrated in FIG. 3, a dark box 18 encasing the converging lens 142 and the image capturing elements 143 is disposed in a bottom section of a housing 35 (indicated by dash-double-dot lines in the figure) that provides an outer frame of the original reading unit 90. The light source unit 140 and the mirror unit 141 are disposed in such a manner as to reciprocate, passing above the dark box 18, in the auxiliary scan directions X (i.e., original reading directions) along the bottom section of the housing 35. The housing 35 is made of, for example, a zinc-plated steel plate.

A scan base 145 to which the light source unit 140 is attached has wire fixing sections 21a and 21b on both ends thereof in main scan directions Y. One of drive wires (specifically, a drive wire 45a) is fixed to one of the wire fixing sections (i.e., the wire fixing section 21a). The other drive wire 45b is fixed to the other wire fixing section 21b. The ends of the scan base 145 are supported by guide rails 36a and 36b respectively so that the scan base 145 can reciprocate on the guide rails 36a and 36b in the original reading directions (i.e., auxiliary scan directions) X. The scan base 145 moves in one of the directions X determined by the direction in which the drive wires 45a and 45b fixed to the ends of the scan base 145 are run around support pulleys 54a and 55a located at both ends, which will be detailed later.

Another scan base 155 to which the mirror unit 141 is attached likewise has wire fixing sections 22a and 22b on both ends thereof in the main scan directions Y. A pulley 49a is attached to one of the wire fixing sections (i.e., the wire fixing section 22a), and the drive wire 45a is run around this pulley 49a. Similarly, a pulley 49b is attached to the other wire fixing section 22b, and the drive wire 45b is run around this pulley 49b. The ends of the scan base 155 are supported by guide rails 37a and 37b respectively so that the scan base 155 can reciprocate on the guide rails 37a and 37b in the auxiliary scan directions X. In other words, the mirror unit 141 attached to the scan base 155 moves in coordination with the light source unit 140 in the same direction as does the light source unit 140 attached to the scan base 145.

A drive motor 38 is a stepper motor driving the light source unit 140 and the mirror unit 141 and rotates under the control of a motor control circuit (not shown). The rotation of an output shaft of the drive motor 38 is transferred to a drive shaft 43 via a timing belt 44 to rotate drive pulleys 39a and 39b (in a driving device of the present invention) attached to respective ends of the drive shaft 43. The drive wires 45a and 45b are wound around the drive pulleys 39a and 39b respectively and fixed to the wire fixing sections 21a, 21b, 22a, and 22b on the respective scan bases 145 and 155. The rotation of the drive pulleys 39a and 39b is converted to linear motion by the drive wires 45a and 45b, thereby moving the scan bases 145 and 155 in the auxiliary scan directions X. The drive shaft 43 and the drive pulleys 39a and 39b are made of steel. The drive wires 45a and 45b are steel wires.

Description of Drive Wire Layout

The drive wire 45a has an end thereof fixed to a hook 46a. The drive wire 45a, extended from the hook 46a, is run around the pulley 49a on the scan base 155 and then fixed to the wire fixing section 21a on the scan base 145 located on a scan-terminating end. Because the pulley 49a moves like a movable pulley, the scan base 155 (the mirror unit 141) moves at a speed half that of the scan base 145 (the light source unit 140). The drive wire 45a, extended further from the scan base 145 where the drive wire 45a is fixed, is run around the support pulley 54a. The drive wire 45a is further extended and wound around the drive pulley 39a before being run around the support pulley 55a on a scan-starting end. The drive wire 45a is further extended around the pulley 49a on the scan base 155. The drive wire 45a, at the other end thereof, is fixed to the housing 35 via a tension spring 47a. Note that there is provided another pulley (not shown) at a place where the drive wire 45a is bent approximately 90 degrees immediately before reaching the tension spring 47a. This pulley changes the direction of tension of the drive wire 45a to the direction of the tension spring 47a attached to the housing 35.

In the structure described above, if the drive pulley 39a rotates clockwise as viewed in FIG. 3, a portion of the drive wire 45a close to the hook 46a is wound, thereby moving the scan bases 145 and 155 from the scan-starting end to the scan-terminating end. As the drive pulley 39a rotates, a portion of the drive wire 45a close to the tension spring 47a becomes slack. However, the pulley 49a moves to the scan-terminating end, straightening the slack portion in a lateral "U" shape. If the drive pulley 39a rotates in the opposite direction (i.e., counterclockwise), the portion of the drive wire 45a close to the tension spring 47a is wound. Then, the lateral "U" shaped portion run around the pulley 49a is wound, thereby moving the scan base 155 from the scan-terminating end to the scan-starting end. This motion of the scan base 155 causes the scan base 145 to move.

The above description concerns one of the drive wires 45a and 45b (specifically, the drive wire 45a). Likewise, the other drive wire 45b has an end thereof fixed to a hook 46b. The drive wire 45b, extended from the hook 46b, is run around the pulley 49b, fixed to the wire fixing section 22b, run around a support pulley 54b, the drive pulley 39b, a support pulley 55b, and the pulley 49b, and at the other end thereof, fixed to the housing 35 via a tension spring 47b.

Description of Drive Pulley Structure

Figure 4:
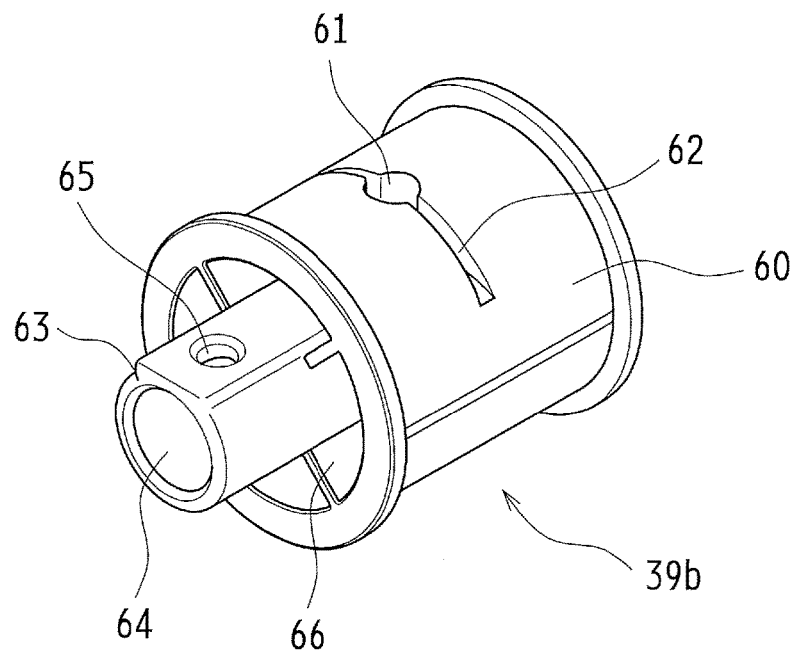
FIG. 4 is an enlarged external perspective view of a structure of a drive pulley.

FIG. 4 is an enlarged external perspective view of a structure of the drive pulley 39b in accordance with the present invention. FIG. 4 only shows the drive pulley 39b.

The drive pulley 39a is shaped symmetrically to, and has a structure similar to, the drive pulley 39b.

The drive pulley 39b is substantially columnar and has a fixing hole 61 and a guide groove 62 on a part of a wire-winding surface 60 that is a side face of the column. There is formed a shaft-attaching portion 63 along the central axis of the column. The shaft-attaching portion 63 is provided with a shaft-insertion hole 64 and a screw hole 65. There is formed a spoke portion 66 along an outer circumference of the shaft-attaching portion 63 so that the shaft-attaching portion 63 is connected to the wire-winding surface 60.

The fixing hole 61 and the guide groove 62 are located approximately at the middle in a width direction of the drive pulley 39b (i.e., the main scan directions Y). The fixing hole 61 is substantially circular and formed vertically from the wire-winding surface 60 to a predetermined depth toward the central axis. The guide groove 62 is shaped like a groove and provided on the wire-winding surface 60, traversing approximately the center of the fixing hole 61. The guide groove 62 is substantially as wide as the drive wire 45b is thick.

The shaft-attaching portion 63 is a hub for attaching the drive shaft 43 to the central axis of the drive pulley 39b. The shaft-insertion hole 64 is a through hole formed along the common central axis of the drive pulley 39b and the shaft-attaching portion 63. The drive shaft 43 is inserted into the shaft-insertion hole 64. The screw hole 65 is a through hole formed through a part of the shaft-attaching portion 63 toward the central axis. The screw hole 65 is provided so that the drive pulley 39b can be fixed to the drive shaft 43 using a screw 70 as will be described later in detail.

Figure 5:
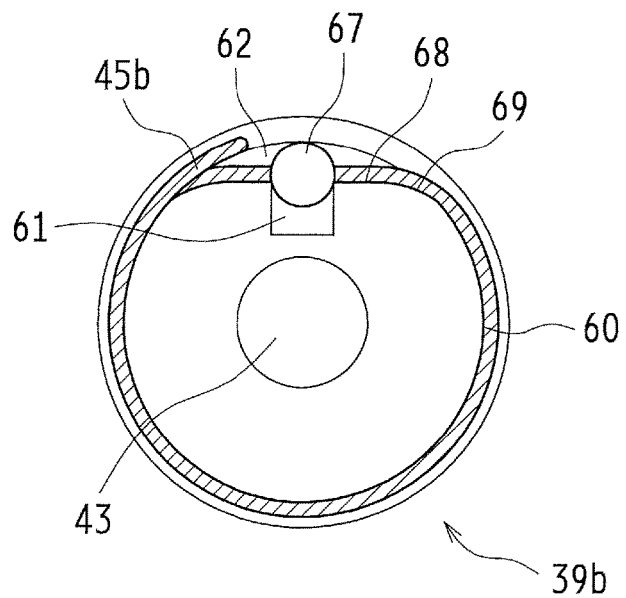
FIG. 5 is a schematic cross-sectional view, taken along a guide groove, of a drive wire wound around a drive pulley.
Figure 6:
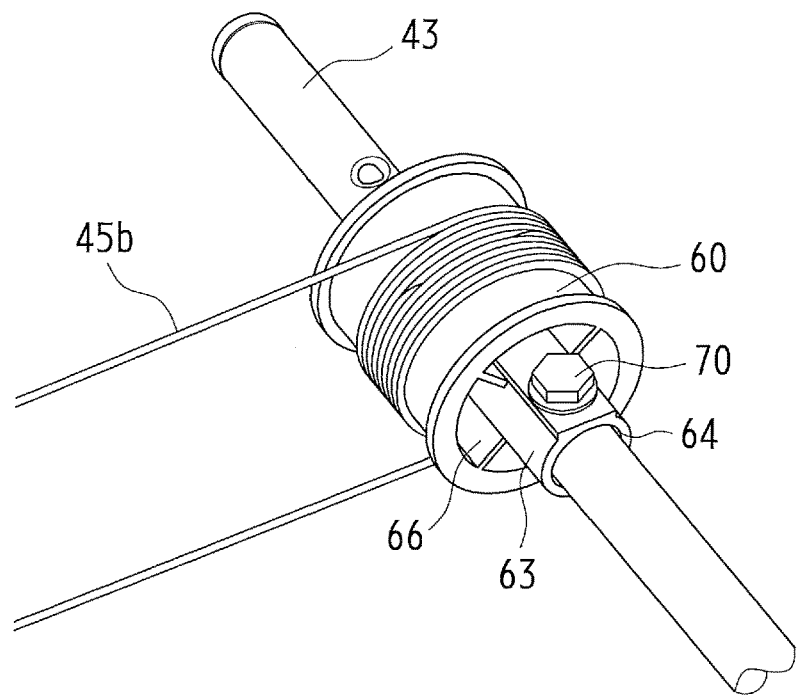
FIG. 6 is an external perspective view of a drive wire wound around a drive pulley.

Description of how to Fix Drive Wire to Drive Pulley and how to Wind Drive Wire Around Drive Pulley Next, how to wind the drive wire 45b around the drive pulley 39b will be described in detail in reference to FIGS. 5 and 6. FIG. 5 is a schematic cross-sectional view, taken along the guide groove 62, of the drive wire 45b wound around the drive pulley 39b. FIG. 6 is an external perspective view of the drive wire 45b wound around the drive pulley 39b.

As illustrated in FIG. 5, a fixing member 67 is attached to the drive wire 45b. A portion of the drive wire 45b is fixed to the drive pulley 39b by depressing the fixing member 67 into the fixing hole 61. FIG. 5 shows an example in which the fixing member 67 is a ball terminal such as a steel ball. In the case of using a ball terminal as the fixing member 67, the ball terminal is made with a diameter substantially equal to or slightly larger than the fixing hole 61. The ball terminal is swaged and fixed to the drive wire 45b and press-fit to the fixing hole 61 in order to fix the drive wire 45b to the drive pulley 39b. By using a ball terminal as the fixing member 67, the drive wire 45b is advantageously restrained from being lifted from the wire-winding surface 60 without the drive wire 45b having to be depressed so much in the direction of the central axis as to be potentially dented. The fixing member 67 may alternatively be a screw that presses down on the drive wire 45b when screwed into the fixing hole 61 having a thread groove on an inner face thereof.

There is formed one flat face portion 68 on both sides of the fixing hole 61 on a bottom face of the guide groove 62. There are also formed curved face portions 69 stretching from the flat face portions 68 to the wire-winding surface 60. Therefore, the drive wire 45b fixed in the fixing hole 61 by the fixing member 67 is wound around the drive pulley 39b, starting at the fixing hole 61 and progressing to the flat face portion 68, the curved face portion 69, and the wire-winding surface 60 in this sequence. The curved face portions 69, stretching from the flat face portions 68 to the wire-winding surface 60, meet the wire-winding surface 60 more gently (i.e., at a smaller angle) than the flat face portions 68 would, if extended, meet the wire-winding surface 60; thus, abrupt changes in angle are prevented. This absence of abrupt changes in angle can make it less likely for bulges to develop due to the flexural rigidity of the drive wire 45b, thereby enabling the drive wire 45b to be wound in close contact with the surface of the drive pulley 39b as illustrated in FIG. 6.

Figure 7:
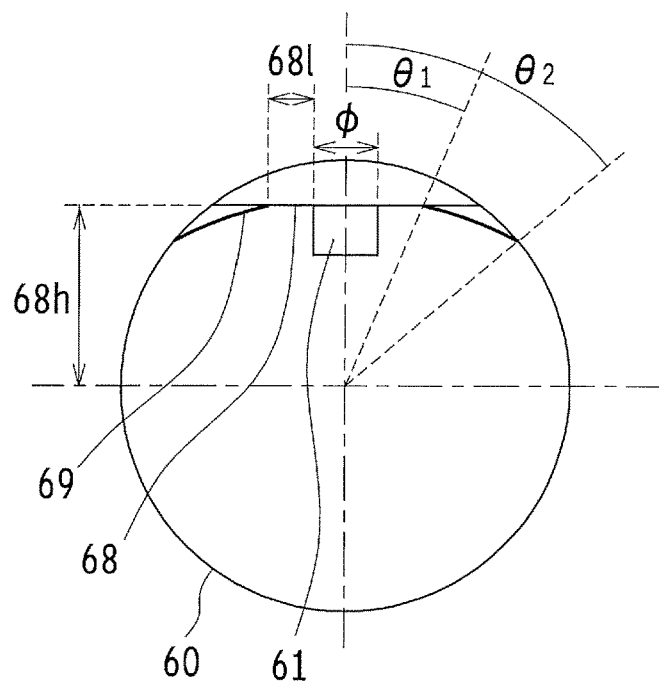
FIG. 7 is a schematic cross-sectional view of a structure of flat face portions and curved face portions formed on a bottom face of a guide groove in a first embodiment.

FIG. 7 is a schematic, detailed cross-sectional view of a structure of the flat face portions 68 and the curved face portions 69 formed on the bottom face of the guide groove 62 in accordance with the present embodiment. FIG. 7 shows only a face of the drive pulleys 39a and 39b on which the drive wire 45b is wound (specifically, the fixing hole 61, the flat face portions 68, the curved face portions 69, and the wire-winding surface 60) and omits the other structural elements.

Each flat face portion 68 would be an equivalent of a chord of the wire-winding surface 60 if the wire-winding surface 60 were a circumference of a circle. The flat face portion 68 is formed with a height 68h measured from the central axis and a length 68l measured from the circular edge of the fixing hole 61 to the curved face portion 69. The fixing hole 61 is a columnar hole with a diameter Ø and formed along a perpendicular to the chord equivalent extending across the two flat face portions 68, the perpendicular equally bisecting the chord equivalent. In other words, the curved face portion 69 is provided on both sides of the fixing hole 61, stretching in a direction in which the drive wire 45 is wound around the drive pulley 39b.

The curved face portion 69 is a convex curved face with a curvature radius R, stretching from edges of the flat face portions 68 to the wire-winding surface 60. $\theta_1$ is an angle made by a boundary of the curved face portion 69 and the flat face portion 68 and a perpendicular passing through the center of the fixing hole 61. $\theta_2$ is an angle made by a boundary of the curved face portion 69 and the wire-winding surface 60 and the perpendicular passing through the center of the fixing hole 61. If $\theta_2$ is excessively large, the flat face portions 68 meet the curved face portions 69 at too large an angle, which increases the possibility of the drive wires 45a and 45b forming a bulge. Therefore, $\theta_2$ is preferably less than or equal to 90°. Even if $\theta_2$ is less than or equal to 45°, the curved face portions 69 meet the wire-winding surface 60 more gently (i.e., at a smaller angle) than the flat face portions 68 would, if extended, meet the wire-winding surface 60, which effectively restrains the drive wires 45a and 45b from being lifted and forming bulges. However, $\theta_2$ is preferably greater than or equal to 45° in order to enable the curved face portions 69 and the wire-winding surface 60 to meet at a relatively small angle and thereby efficiently render bulges less likely to develop.

These fixing hole 61, flat face portions 68, curved face portions 69, and wire-winding surface 60 are designed using parameters having values suitable for gently connecting the curved face portions 69 to the wire-winding surface 60.

EXAMPLE

The drive pulleys 39a and 39b shown in FIG. 7 were designed, as an example, by setting the diameter of the wire-winding surface 60 to 22.45 mm, the curvature radius R of the curved face portions 69 to 6.0 mm, the diameter Ø of the fixing hole 61 to 4.0 mm, the height 68h of the flat face portions 68 to 8.725 mm, the length 681 of the flat face portions 68 to 2.28 mm, and $\theta_2$ to 58.565°. A ball terminal having a diameter of 4.0 mm was swaged and attached as the fixing member 67 to the drive wires 45a and 45b having a diameter of 1.0 mm. The drive wires 45a and 45b were then wound around the drive pulleys 39a and 39b designed under the conditions listed above. As a result, the drive wires 45a and 45b could be wound satisfactorily in close contact with the flat face portions 68, the curved face portions 69, and the wire-winding surface 60. The drive wires 45a and 45b did not form any bulges.

As described above, the drive pulleys 39a and 39b in accordance with the present embodiment has the flat face portions 68 and the curved face portions 69 formed on the bottom face of the guide groove 62. This structure can restrain the drive wire 45b from being lifted and forming bulges, reduce irregular winding caused in driving by the bulges of the drive wire 45b, and thereby move the light source unit 140, which is a driven body, at a uniform speed. Accordingly, the image reading device is capable of reducing blurring in scanned images, thereby producing good scanned images. The image forming apparatus 100 is thus capable of forming good images.

Second Embodiment

Figure 8:
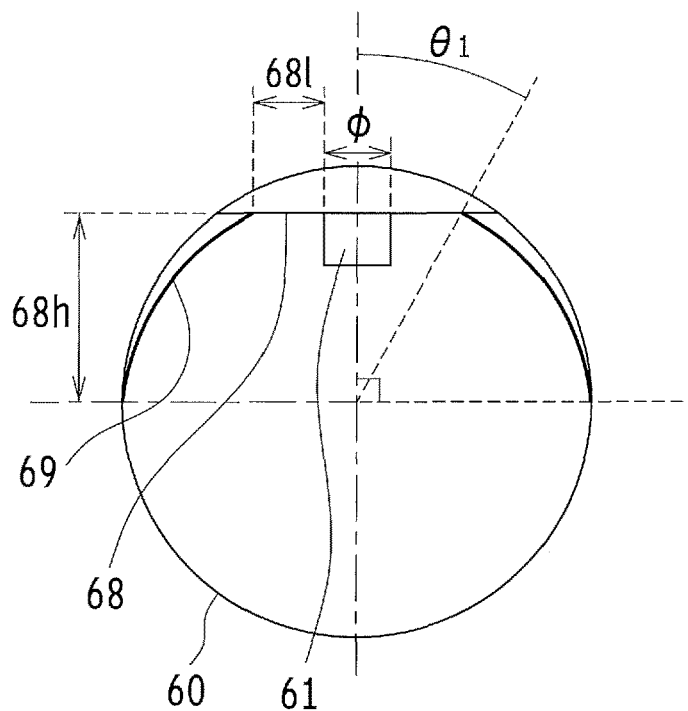
FIG. 8 is a schematic cross-sectional view of a structure of flat face portions and curved face portions formed on a bottom face of a guide groove in a second embodiment.

The following will describe in detail a second embodiment of the present invention in reference to drawings. The present embodiment differs from the first embodiment in the design of the flat face portions 68 and the curved face portions 69, but is otherwise the same as the first embodiment. Overlapping descriptions are therefore omitted. FIG. 8 is a schematic cross-sectional view of a structure of flat face portions and curved face portions formed on a bottom face of a guide groove in the present embodiment.

As illustrated in FIG. 8, $\theta_2$ is set to 90° in the present embodiment. In the present embodiment, as is the case with the first embodiment, the flat face portions 68 meet the curved face portions 69 at a relatively small angle, and the curved face portions 69 meet the wire-winding surface 60 at relatively small angles. This structure is hence capable of restraining the drive wires 45a and 45b from being lifted and forming bulges.

Third Embodiment

Figure 9:
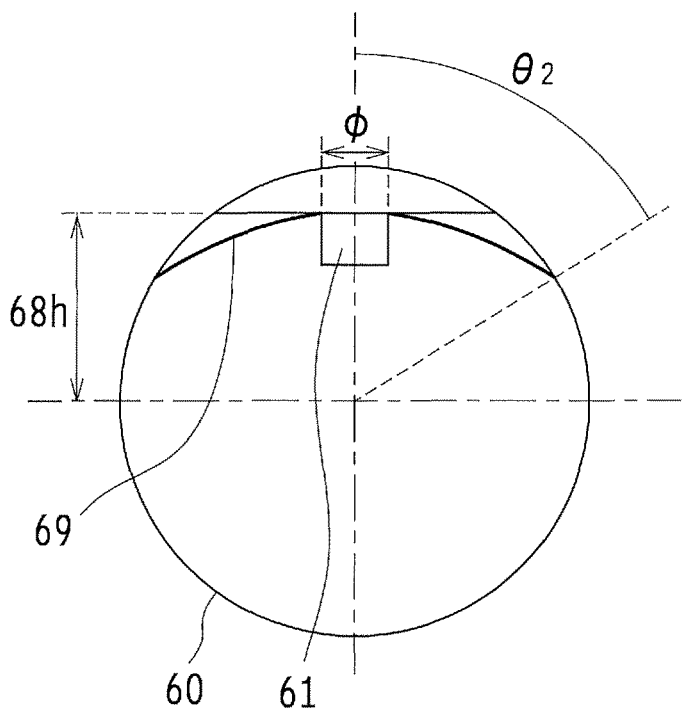
FIG. 9 is a schematic cross-sectional view of a structure of flat face portions and curved face portions formed on a bottom face of a guide groove in a third embodiment.

The following will describe in detail a third embodiment of the present invention in reference to drawings. The present embodiment differs from the first embodiment in that no flat face portions 68 are provided, but is otherwise the same as the first embodiment. Overlapping descriptions are therefore omitted. FIG. 9 is a schematic cross-sectional view of a structure of flat face portions and curved face portions formed on a bottom face of a guide groove in the third embodiment.

As illustrated in FIG. 9, the curved face portions 69 are provided stretching from the circular edge of the fixing hole 61 to the wire-winding surface 60 in the present embodiment. In the present embodiment, as is the case with the first embodiment, the curved face portions 69 meet the wire-winding surface 60 more gently (i.e., at a smaller angle) than the flat face portions 68 would, if extended, meet the wire-winding surface 60. This structure is hence capable of restraining the drive wires 45a and 45b from being lifted and forming bulges.

Fourth Embodiment

Figure 10:
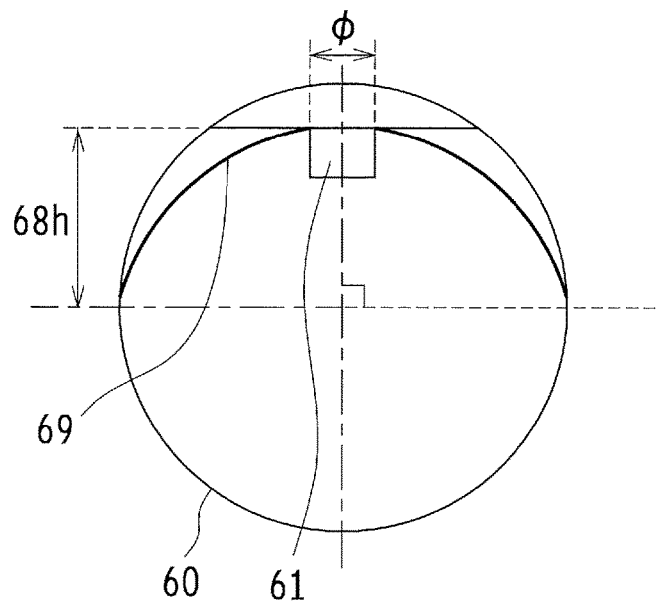
FIG. 10 is a schematic cross-sectional view of a structure of flat face portions and curved face portions formed on a bottom face of a guide groove in a fourth embodiment.
Figure 11:
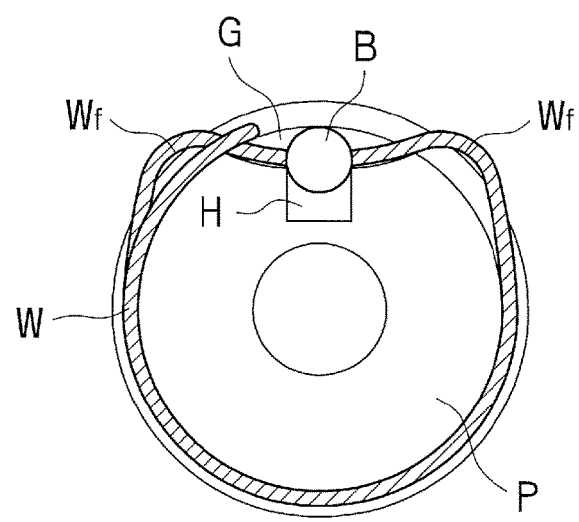
FIG. 11 is a schematic cross-sectional view of a drive pulley and a drive wire in a conventional driving device.
Figure 12:
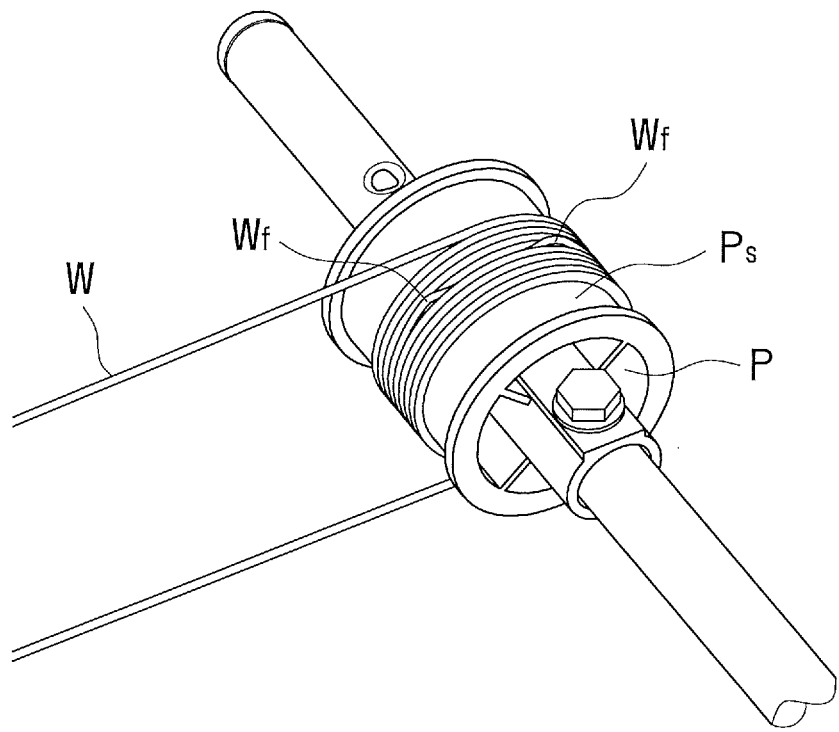
FIG. 12 is an external perspective view of a drive pulley and a drive wire in a conventional driving device.

The following will describe in detail a fourth embodiment of the present invention in reference to drawings. The present embodiment differs from the first embodiment in that no flat face portions 68 are provided and also in the design of the curved face portions 69, but is otherwise the same as the first embodiment. Overlapping descriptions are therefore omitted. FIG. 10 is a schematic cross-sectional view of a structure of flat face portions and curved face portions formed on a bottom face of a guide groove in the fourth embodiment.

As illustrated in FIG. 10, in the present embodiment, the curved face portions 69 are provided stretching from the circular edge of the fixing hole 61 to the wire-winding surface 60, and $\theta_2$ is set to 90° so that the curved face portions 69 are formed to cover the largest possible area. In the present embodiment, as is the case with the first embodiment, the curved face portions 69 meet the wire-winding surface 60 more gently (i.e., at a smaller angle) than the flat face portions 68 would, if extended, meet the wire-winding surface 60. This structure is hence capable of restraining the drive wires 45a and 45b from being lifted and forming bulges.

The embodiments disclosed herein are for illustrative purposes only in every respect and provide no basis for restrictive interpretations. The scope of the present invention is defined only by the claims and never bound by the specification. Those modifications and variations that may lead to equivalents of claimed elements are all included within the scope of the invention.

What is claimed is:

1. A driving device comprising a drive wire and a drive pulley,
    the drive wire being wound around the drive pulley,
    the drive pulley being configured to rotate to move a driven body connected to the drive wire, wherein
    the drive pulley has a fixing hole and a guide groove on a wire-winding surface thereof on which the drive wire is wound,
    the drive wire is disposed in the guide groove and fixed in the fixing hole by a fixing member,
    a bottom face of the guide groove has a curved face portion formed in a boundary region of the wire-winding surface and the guide groove,
    a flat face portion is formed between the fixing hole and the curved face portion, and
    a length of an arc of the curved face portion is longer than a length of the flat face portion.

2. The driving device according to claim 1, wherein a boundary of the curved face portion and the wire-winding surface and a direction in which the fixing hole is extended make an angle of less than or equal to 90° around a rotational axis of the drive pulley.

3. The driving device according to claim 1, wherein the fixing member is a ball terminal provided on a portion of the drive wire.

4. The driving device according to claim 1, wherein a width of the guide groove is substantially equal to a thickness of the drive wire.

5. The driving device according to claim 1, wherein the curved face portion is provided on both sides of the fixing hole in a direction in which the drive wire is wound.

6. An image reading device comprising the driving device according to claim 1, the driven body being a light source unit configured to read an object as an image.

7. An image forming apparatus comprising: the image reading device according to claim 6; and a printing unit configured to print the image of the object read by the image reading device on recording paper.

8. The driving device according to claim 1, wherein the driving device satisfies the relation:

$$\theta_2 - \theta_1 > \theta_1;$$

wherein $\theta_1$ is an angle made by a boundary of the curved face portion and the flat face portion, and a perpendicular passing through a center of the fixing hole; and $\theta_2$ is an angle made by a boundary of the curved face portion and the wire-winding surface, and the perpendicular passing through the center of the fixing hole.

* * * * *